March 13, 1951   A. H. BAKER   2,544,947
LEHR TEMPERATURE CONTROL
Filed Jan. 19, 1946   3 Sheets-Sheet 1
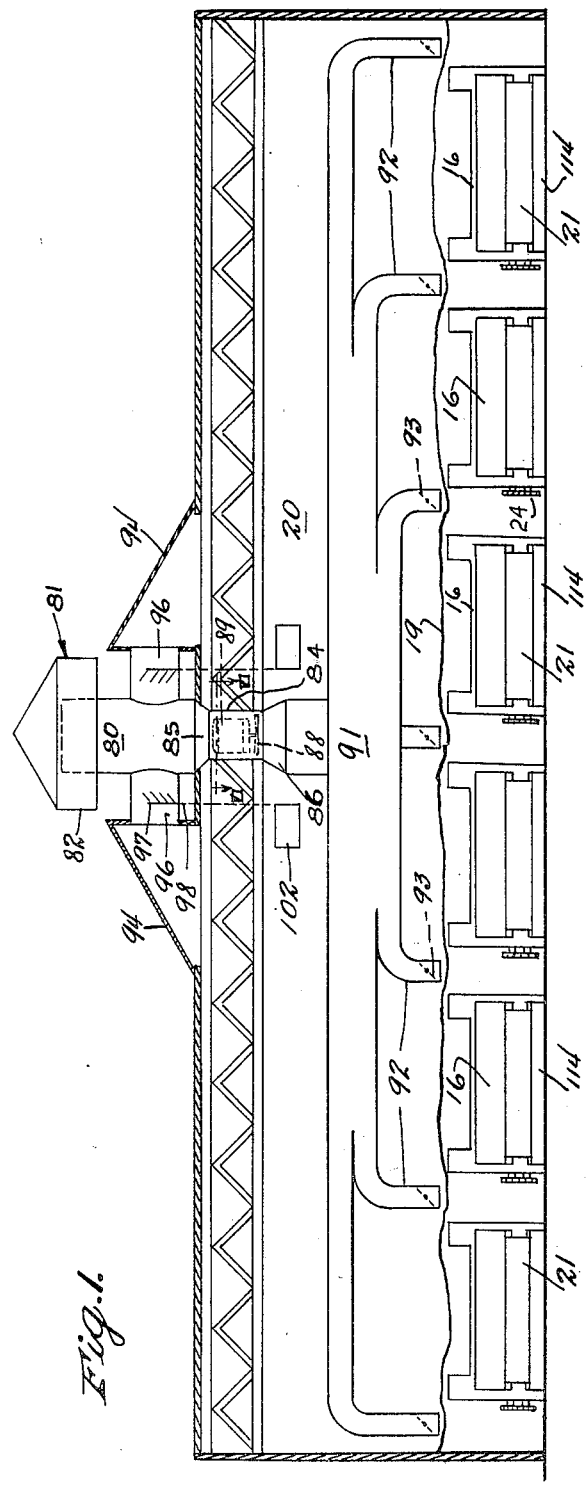
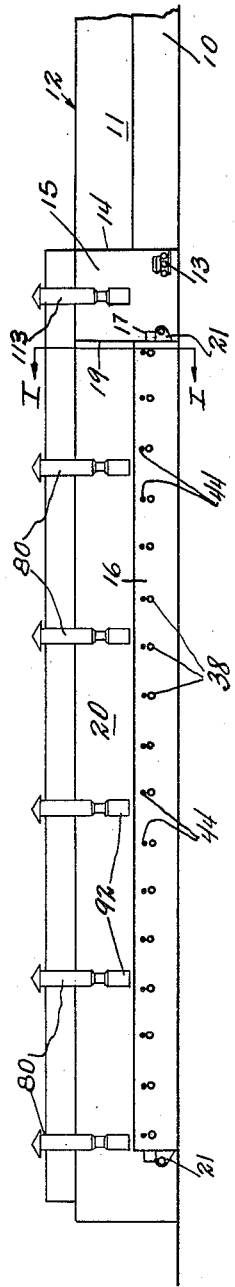
Inventor
ARVID H. BAKER
By Olen E Bee
Attorney March 13, 1951  A. H. BAKER  2,544,947
LEHR TEMPERATURE CONTROL
Filed Jan. 19, 1946  3 Sheets-Sheet 2

Inventor
ARVID H. BAKER
By Olen E. Bee
Attorney

March 13, 1951     A. H. BAKER     2,544,947
LEHR TEMPERATURE CONTROL
Filed Jan. 19, 1946     3 Sheets-Sheet 3

Inventor
ARVID H. BAKER
By Olen E Bee
Attorney

Patented Mar. 13, 1951

2,544,947

UNITED STATES PATENT OFFICE 2,544,947

LEHR TEMPERATURE CONTROL

Arvid H. Baker, Port Allegany, Pa., assignor to Pittsburgh Corning Corporation, Allegheny County, Pa., a corporation of Pennsylvania Application January 19, 1946, Serial No. 642,163

13 Claims. (Cl. 49—47)

The present invention relates to processes of and apparatus for annealing glass materials by cooling them gradually from a temperature above the critical range down to a temperature at which they can be handled. The invention has particular relation to processes of and apparatus for annealing cellulated glass of the type obtained by heating to the sintering point a mixture of finely crushed glass and a suitable gassing agent, such as carbon black, lamp black or the like.

One object of the invention is to provide a lehr system which is highly stable in operation and which involves a minimum of controls in order to maintain a desired temperature gradient.

A second object is to provide a lehr system in which a predetermined gradient of temperature from end to end of the lehr can be maintained with a high degree of accuracy.

A third object is to provide a lehr system suitable for annealing cellular glass slabs or other articles of considerable height in which the temperature in the lehr in a given zone is relatively uniform from top to bottom.

A fourth object is to obviate fluctuations in the operation of the lehr due to changes in the weather.

A fifth object is to obtain control of the temperature and movements of the ambient air in the room about the annealing lehrs.

These and other objects of the invention will be apparent from consideration of the following specification and the appended claims.

It has heretofore been proposed to manufacture bodies of relatively light weight which are substantially impermeable to water and moisture and which have a high resistance to heat transmission, by mixing finely powdered glass and a reducing agent, such as carbon black, and heating the mixture in suitable molds until the glass particles are sintered and cohered together and simultaneously gases are generated within the sintered mass in order to cause it to bloat or cellulate. The resultant bodies comprise a froth of small cells or bubbles, of exceedingly light weight and being excellently adapted for many commercial uses.

In the manufacture of slabs or blocks of such material, extremely high loss is often experienced in the annealing operations. In accordance with the provisions of the present invention these losses can be explained, in part at least, as follows:

The material, by reason of its high resistance to heat transmission, requires much time in cooling in its interior. The time required in such cooling operation may well be five or six times or even longer than that required in the annealing of conventional glass articles. By reason of the cellular structure, the mechanical strength of the bodies is relatively low, a small fraction of that of ordinary glass bodies of equal weight, so that the ware is particularly subject to breakage by thermal stress or shock, such as may attend too rapid changes of temperature, even changes so slight that they would not affect conventional glassware of normal density. Furthermore, the slabs or blocks, as obtained by the sintering of the glass and gassing agent, are usually quite large being, for example, 18 inches or 2 feet in height. Conventionally, they are annealed upon a traveling belt in a continuous type lehr while they are set upon edge in spaced relation. It will be apparent that in a lehr of sufficient height to permit the passage of bodies of this size, there is considerable tendency for convectional movement of gases. As the hot gases rise between the slabs or blocks, relatively sharp temperature gradients are likely to be set up. Tests indicate that, if convection is unopposed, these differentials may be as high as 100° or 200° F. between the top and the bottom edges of the slabs. Such gradients may easily produce stresses and strains in the slabs which will cause cracking and checking. It now appears that changes in the atmosphere in and about the lehr produced by accidental drafts in the lehr room or changes in the weather may produce cracking and breaking of the ware.

In accordance with the provisions of the present invention, checking and breakage of the ware has been reduced or substantially eliminated, firstly, by division of the lehr into a plurality of temperature zones in each of which heat is individually added or subtracted to attain the desired temperature and at the same time the gases are circulated vertically within these individual zones to prevent thermal stratification and without undue mingling of the gases of one zone with gases in contiguous zones.

Secondly, the invention contemplates the provision of a system whereby the ambient air from end to end of the lehr is maintained at a relatively uniform temperature at all times and in which the circulation of the atmosphere about the lehr is controlled to obviate accidental drafts and pronounced temperature changes.

For a better understanding of the invention, reference may now be had to the accompanying drawings in which like numerals refer to like parts throughout.

In the drawings:

Fig. 1 is a sectional view transverse of a lehr system embodying the principles of the invention.

Fig. 2 is a diagrammatic view taken longitudinally of a lehr system embodying the invention.

Figure 3:
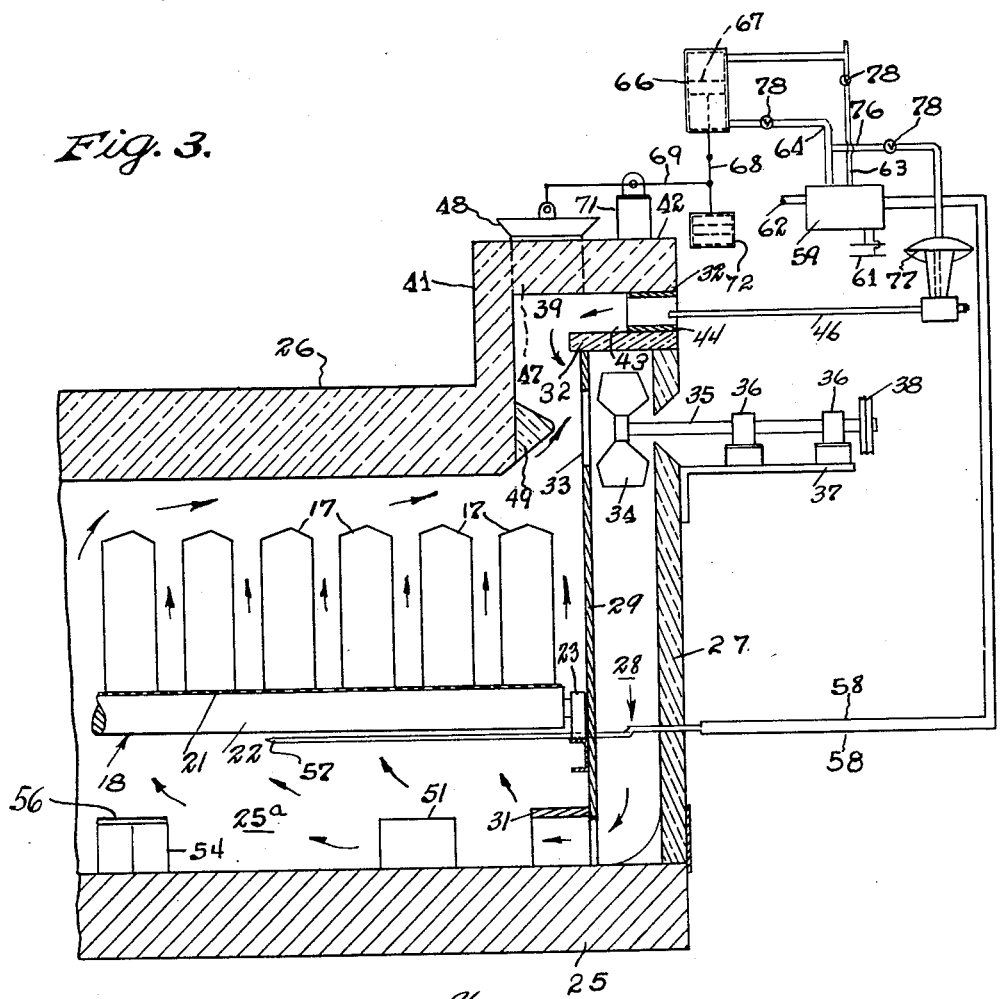
Fig. 3 is a fragmentary sectional view through substantially one half of a lehr embodying the principles of the invention.

In the practice of the invention, molds containing appropriate charges of crushed glass and a reducing agent, such as carbon black are passed through a roller hearth type furnace 10 disposed in a room 11 of a suitable enclosing building 12. The roller hearth furnace preferably embodies heating means such as gas burners (not shown) and a conveyor system designed to carry the molds slowly through the furnace through a period of time sufficient to permit adequate sintering and cellulation of the contents of the molds. At the exit end of the furnace a partition or screen 14 is provided shutting off the furnace room from the lehr loading chamber 15. The molds containing the freshly formed cellulated bodies are discharged into the lehr loading chamber 15 in which are disposed loading ends of the lehrs 16 of long, tunnel type. In the chamber the molds are stripped and cellulated slabs 17 are then passed to a conveyor system 18 running longitudinally of the lehr and dividing same into upper and lower zones. A partition 19 shuts off the chamber 15 from lehr room 20 containing any number of lehrs desired, e. g. 6, disposed in spaced parallel relation. Each conveyor system includes a flexible foraminous belt 21 which preferably is formed of a mesh of chain links of an appropriate material such as heat resisting steel and being carried by a system of rollers 22 journaled in bearings 23 and being driven by suitable means (not shown). This belt 21 substantially divides the lehr vertically into upper and lower zones. The slabs or blocks are set on edge in spaced relation, upon belt 21, in position to occupy a minimum of horizontal space, while permitting gases to circulate freely vertically from the lower into the upper lehr zone.

In the annealing of cellular slabs or blocks, the annealing period is quite long, for example, twenty hours or more dependent upon the thickness of the ware and for this reason the tunnel lehr itself must be of considerable length in order to admit of a sufficient time for annealing of the ware during its passage through the lehr. The lehr is divided into a multiplicity (e. g. 20 or 30) of short sections or temperature zones. A length of about five feet has been found to be satisfactory for such temperature zones although, of course, a certain degree of variation either shorter or longer is permissible.

Fig. 3 constitutes a fragmentary section through one side of one of these temperature zones which may be regarded as typical of all.

The opposite side is essentially symmetrical with the side shown. It embodies means for circulating the gases individually within each temperature zone without any great tendency of the gases to progress longitudinally of the lehr more than is necessary to maintain a gradual gradient in temperature from one zone to the contiguous zone and also to permit escape of the gases introduced into the lehr. In the embodiment of the apparatus shown in Figs. 2 and 3 of the drawings, the lehr comprises a bottom 25, top wall 26 and side walls 27. Each top wall 26 has an offset therein formed by wall 41 which is connected to side wall 27 by means of wall 42. The conveyor belt 21 is disposed intermediately of top wall 26 and bottom wall 25 of the lehr and upon its attendant rollers 22 to substantially divide the lehr vertically into top and bottom zones.

Disposed longitudinally of each side wall 27 are lehr gas circulation ducts 28, the outer wall of which is formed by lehr wall 27, the inner wall being partition 29 and the side walls extending between wall 27 and partition 29 to complete the duct. The top of each duct is closed by a top wall 32. Adjacent the upper end of each duct 28 is an inlet aperture 33 in partition 29 and at the bottom of each duct is an outlet aperture in partition 29 preferably provided with a horizontally extending hood 31.

Means for controlling the temperature and circulation of gases within each duct 28 includes an ambient atmosphere inlet 47, a gas burner 44 and fan 34. The ambient atmosphere inlet comprises an opening 47 in the lehr top wall 42 adjacent each duct 28 and is controlled by a frusto-conical damper 48 which can be carried in any convenient manner and which can be adjusted manually or automatically by suitable thermostatic controls. The gas burner 44 is mounted in suitable apertures of the lehr side wall 27 above the top wall 32 of each duct. These burners are connected to a suitable source of fuel such as conduit 46. For the purpose of setting up circulation of gases within each duct 28, a suitable fan 34 is disposed within the duct opposite inlet 33 and is supported by suitable shaft 35 extending through a suitable aperture in the lehr side wall 27. This shaft is journaled in appropriate bearings 36 mounted upon any convenient support 37 and provided at its outer extremity with a suitable pulley 38 driven by suitable means such as a belt and motor (not shown). As will be observed upon reference to Fig. 3, each duct 28 is in draft connection with the upper zone of the lehr and the offset portion of the lehr top wall containing the inlet 47 and burner 44, through inlet 33 of the duct. To improve the effectiveness of such draft connection, there is mounted upon the roof wall 41 a suitable deflector 49 disposed opposite to the duct inlet 33 for the purpose of simultaneously deflecting lehr gases drawn from above the belt 21 and cooling or heating gases from above the duct.

Figure 4:
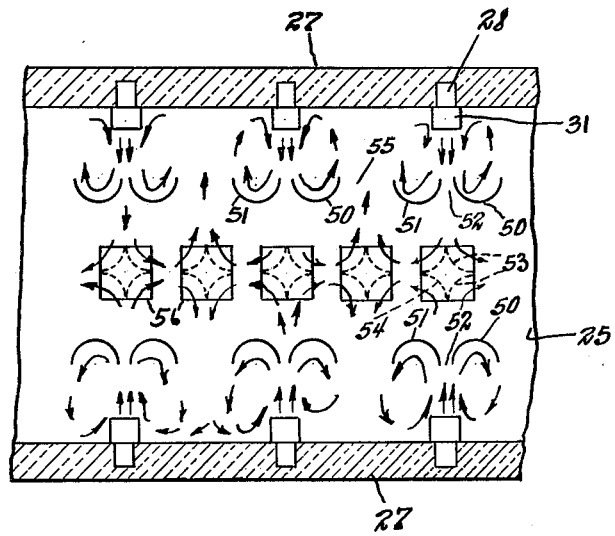
Fig. 4 is a fragmentary sectional view taken on a horizontal plane illustrating the baffles for diffusion of the gases in the lower zone of the lehr.

A baffle system for diffusing and directing the circulating gases in the lower lehr zone is illustrated in Figs. 3 and 4 of the drawings. These baffles comprise longitudinally extending rows of members staggered transversely of the lehr. The front row comprises curved plates disposed in pairs, the first pair being indicated as 50 and 51 of approximately semi-circular section and being in spaced relation with the space 52 providing a bell mouth passage substantially directly opposite the outlet 31 of the flue 28. As shown a portion of the gases from the flue will pass through the bell mouth, and a portion will be baffled and deflected backwardly toward the sides of the lehr as indicated by the arrows in Fig. 4.

The portion of the gases passing between the plates 50 and 51 is directed against the apex or cusp of the baffles 53 and 54. These preferably are of an arc of approximately 90° and the contiguous edges thereof meet in such a manner that the gases flow across the lehr and are deflected at approximately right angles and are again directed at right angles between adjacent plates of the next set of baffles. The stream of gases striking the plate 54, for example, are deflected back by the plate of the contiguous set into the zone 55 between baffle 50 and the contiguous baffle 51 of the adjacent set. It will thus be seen that there is sufficient comingling of the gases from the different flues to avoid abrupt changes in temperature between zones, but without substational progress of the gases as a body axially of the lehr except as required to permit gases to flow out. If desired, cover plates 56 may also be placed over the baffles 53 and 54 in order to assist in the thorough comingling and distribution of the gases. The gases after being deflected by the baffles gradually rise upwardly, probably spirally about a vertical axis, and pass through the foraminous supporting belt 21 upon which the cellular slabs 17 are disposed and between the slabs where they exert their cooling action. They then pass upwardly and outwardly through the throat 33 of the flue 28 for reconditioning and recycling. The flow of gases is maintained sufficiently vigorous to prevent any substantial variation of temperature at different levels above the conveyor belt 21.

It will be apparent that the damper 48, the burner 44 and the fan 34 can be adjusted manually to obtain the desired temperature within the zone of the lehr in which these agencies are disposed. By reason of the inherent stability of the system due in part to the uniformity of the atmosphere about the lehr (which constitutes subject for further discussion in another portion of the specification), only occasional manual manipulation will be required in most of the zones of the lehr. However, if preferred, the system can be controlled automatically or certain zones of the system, for example, the first few zones at the entrance of the lehr, can be controlled automatically by means of thermostatic mechanism of any appropriate design. Elements suitable for use in such thermostatic control system are well known in the art and generally can be purchased commercially. Therefore, the elements are to be indicated herein merely diagrammatically.

The control system may conveniently include a thermocouple 57 disposed in a suitable portion of the lehr system. It may, for example, be disposed below the conveyor belt carrying the cellular glass blocks or slabs to be annealed. This thermocouple is connected by conductors 58 with a suitable relay mechanism 59 for amplification of the relatively weak currents generated by the thermocouple, the relay mechanism in turn being provided with electrical conductors 61 for supplying the necessary power for operation. The relay also includes a conduit 62 for supplying fluid under pressure. Appropriate valves (not shown) are provided for the conduit 62 for automatic control by the relay mechanism. Conduits 63 and 64 from the conduit 62 are connected respectively to the upper and lower extremities of an actuating cylinder 66 which is provided with piston mechanism 67 connected by link 68 to the operating lever 69 of the valve 48. The lever may be pivoted at an intermediate portion upon a suitable fulcrum 71 upon any convenient support. Dash pot 72 retards movements of the piston mechanism 67.

Conduit 64 is also joined by conduit 76 to the diaphragm chamber of a diaphragm valve 77 which valve is disposed in the fuel line 46 in order to control the supply of fuel to the burner 44. It will be apparent that when the temperature within the flue 28 reaches a predetermined point, the pressure through the line 76 is changed to open or close the valve 77 thus regulating the supply of fuel to the burner.

Usually, control of a single factor, namely, the air inlet 47 or the feed of gas to the burner 44 is adequate to maintain the temperature of the zone in the lehr. This is especially true after the lehr has been operating sufficiently long to attain stability. Therefore, it is desirable to adjust only a single element, namely, the burner 44 or the air inlet, dependent upon the position of the burner in the series, to maintain the operating temperature. To this end, valves 78 are disposed in lines 63, 64, and 76, so that by opening or closing of the valves one or the other control can be rendered inoperative. It will be apparent that on some units one control can be cut out while on others the other control is rendered inoperative. It is reiterated that most usually only certain key zones on a lehr such as the first two or three zones at the entrance and perhaps the last few zones require automatic control. The rest can be set manually and only require adjustment at rare intervals.

Apparatus for controlling the temperature and preventing uncontrolled circulation of the atmosphere about the lehrs includes the screens or barrier 14 and 19 already referred to for purposes of preventing circulation of gases of the zone about the roller hearth furnace 10 into chamber 20. For purposes of further controlling the temperature in the atmosphere, ventilator columns or stacks 80 are provided extending above the roof of the building and being provided with covers 81 having skirts 82 designed to prevent entrance of rain while permitting the free entrance of gases into the stack. Any number of these stacks may be provided. However, for purposes of obtaining uniformity of circulation, a plurality is preferred. Usually they will be spaced about 20 feet longitudinally of the building.

Figure 5:
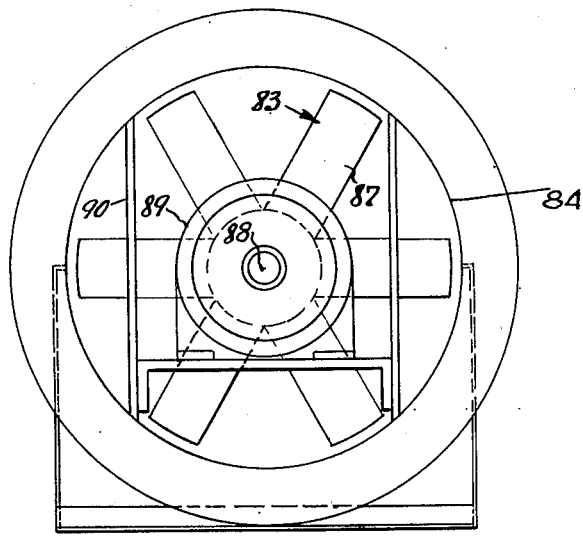
Fig. 5 is a sectional view taken substantially upon the line V—V of Fig. 1 showing on an enlarged scale a fan structure for circulating air in the lehr room.

Below the roof of the building, the stack is provided with a fan of coaxial type indicated at 83 and including a restricted throat portion 84 and upper and lower taper portions 85 and 86. Within the throat is disposed the fan mechanism best illustrated in Fig. 5 and including fan blades 87 preferably of propeller type radiating from the lower extremity of a shaft which extends downwardly from a motor 89. This motor is carried by braces 90 disposed transversely in the throat portion 84 of the stack.

At the lower extremity of each stack is disposed a transverse conduit 91 having downwardly directed branches 92 designed to discharge air in the space between the lehrs. It will be apparent that the branches may be provided with dampers 93 which may be of the simplest type and may be adjusted manually. After the system is once set, regulation of the dampers is seldom required.

It will be apparent that under certain atmospheric conditions, for example, in very cold weather it may be desirable to reduce the proportion of cold air introduced from the outside of the lehr building while at the same time maintaining the relatively vigorous circulation of the gases in the room for purposes of overcoming natural drafts which might cause chilling in one section of the room while other sections were overheated.

Figure 6:
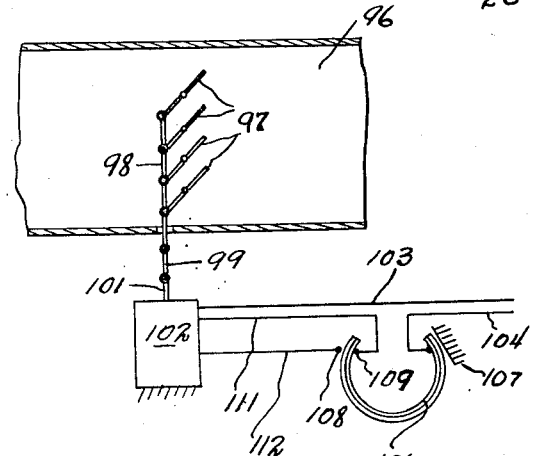
Fig. 6 is a fragmentary sectional view of a shutter mechanism for controlling the lehr room temperature.

To this end penthouses 94 are provided upon the roof upon opposite sides of the stacks 85 and are connected with the stacks by means of conduits 96. These penthouses collect the heated air from the upper portion of the room for recirculation through the stacks 80. In order to regulate the proportion of heated air thus recirculated, each of the conduits 96 is provided with shutters 97 preferably of the Venetian blind type and being interconnected at one edge by means of a vertical bar 98. This bar as shown in Fig. 6 is in turn connected by a link 99 to the extremity of a plunger 101. This plunger is operated by suitable electromagnetic device of conventional design in a housing 102 upon any convenient support.

For purposes of automatically controlling the dampers to obtain the desired temperature in the lehr room, the electromagnetic device 102 is connected to a source of electrical power comprising bus bars 103, 104 the latter of which is connected at one extremity to a bimetallic strip 106 of conventional design secured to a support 107. Upon opposite sides of this strip are disposed contact points 108 and 109 designed to be contacted by the strip in event of slight movements of the strip from normal position as a result of temperature changes. The points are connected by means of conductors 111 and 112 to the electromagnetic device in order to actuate the device upon any substantial change of the temperature from normal. It will be apparent that conduits 111 and 112 are connected into the system in such manner that contact of the bimetallic element with one point results in opening of the shutters while contact with the other point results in closing movements so that to reduce or cut out the recirculation of heated air from above the lehr to the chamber. It will be obvious that the construction disclosed for operating the shutters automatically is merely for purposes of illustration. Mechanism suitable for the purpose is a commercial commodity and it is not believed that detailed illustrations of suitable apparatus for the purpose is required. It will be apparent that the bimetallic elements 106 may be disposed in any typical or strategic portion of the lehr chamber or room which may seem feasible or expedient. Also as many bielements as desired may be employed. For example, one bimetallic element for each of the transverse conduits 96 may be employed or, if preferred, all of the shutter mechanisms may be controlled by a single bimetallic element suitably connected to electrical operators. It will be also apparent that only a portion of the ventilators may be provided with automatic controlled devices while the remainder of the stacks are controlled by manually operated shutters to obtain the desired recirculation of air in the lehr room.

The stacks and their attendant ducts, in effect divide the lehr room into a series of circulation zones much the same as the lehr is divided into zones. Independent control of the temperature in each zone could be employed, but usually is not necessary. The stacks are sufficiently large and numerous to maintain a vigorous turnover of air in the room, overcoming accidental drafts and drifts and breaking up stagnant pockets. An average turnover or cycle of the air about every two to eight minutes is desirable. Such turnover, of course, involves the cool air from the stacks and the warm air from the room mixed with it. The air in the lehr room may be maintained under slight pressure, e. g. .01 to 1 inch of water, to assist in preventing accidental air through doors, windows or other openings in the building.

For removal of air from the lehr room or chamber 20 natural leakage may be relied upon. However, controlled removal of air may also be provided for. To this end openings may be provided in partition 19. These openings 114 may be provided below the conveyor belts 21 so that the air flows out into the mold stripping chamber 15. To assist in exhausting the gases and dust from this chamber a stack 113 is provided and is provided with a fan (not shown) rotating to draw the gases entering the chamber upwardly and to discharge them to the atmosphere.

In the operation of the apparatus, the thermostatic elements 106 are adjusted to open or close the shutters 97 in conduits 96, upon any slight variation, for example, 3 or 4° from a predetermined normal for the lehr chamber. In cold weather the shutters will be open to a considerable degree or completely or will be open a relatively large proportion of the time so that a great deal of air in warm state is withdrawn from the upper portion of the lehr chamber, mixed with a relatively small amount of cold air and recycled to the chamber. As the temperature goes up the dampers will close or partially close to reduce the amount of warm air introduced into the system and correspondingly to increase the amount of cold air. In warm weather, on the other hand, the dampers will be partially or completely closed or will close at frequent intervals and for considerable periods of time so that only a small amount of warm air is recycled and most of the air is relatively cold from outside the building. Thus, the temperature within the room containing the lehrs is maintained constant or nearly constant. At the same time, it will be apparent that the strong blasts of air forced downwardly into the room by the fans 88 and discharging through the outlets or branches 92 maintain the atmosphere within the room in vigorous and controlled movement, thus preventing stratification of warm air and cold air and also preventing unpredictable drifts or movements of hot or cold air about the room to induce unexpected changes in the conditions within the lehr.

Within the lehr itself, the atmosphere in each short zone can be maintained in vigorous circulation without greatly influencing the circulation in the contiguous zones and the temperature in each zone can be adjusted to obtain a desired gradient of temperature from zone to zone without greatly disturbing the contiguous zones. When the controls for a given zone have once been set to desired values the setting is maintained without further adjustment, at least for long periods of time because of uniformity of the atmosphere within the lehr room. Such small changes in the lehr temperature as may occur by reason of variations in the loading of the lehr or other factors are easily corrected by automatic controls disposed in the zones contiguous to the entrance of the lehr or in other strategic sections.

The forms of the invention herein shown and described are to be regarded merely as exemplary. It will be apparent to those skilled in the art that numerous modifications may be made therein without departure from the spirit of the invention or the scope of the appended claims.

I claim:

1. In a process of annealing cellular glass slabs in which the slabs are disposed in spaced, vertical position upon a foraminous conveyor system moving slowly through an annealing lehr in a horizontal plane near the middle of the lehr, the step of discharging annealing gases below the conveyor system transversally of the lehr, causing the gases to spiral upwardly about a vertical axis and pass through the conveyor and between the slabs in a multiplicity of short zones, individually collecting the gases from each zone at the top of the lehr and returning them to their individual starting points below the conveyor system without substantial movement longitudinally of the lehr, the temperatures of the zones being graduated downwardly from zone to zone.

2. Apparatus for annealing cellular glass slabs, comprising a tunnel-like lehr, a foraminous conveyor belt adapted to support cellular glass slabs in vertical position upon one edge disposed to provide substantial spaces above and below the belt, means for gradually cooling slabs of glass upon the conveyor belt comprising a series of vertical conduits disposed at short intervals along each side of the lehr, fans in the conduits for circulating the gases in the lehr, each conduit having an outlet for the gases below the conveyor belt, baffle means below the belt for causing the gases to rotate horizontally and spiral upwardly and an inlet above the conveyor belt whereby gases are circulated cyclically in a zone transverse of the axis of the lehr substantially individually in each zone and a means for controlling the temperature of each zone individually.

3. Apparatus for annealing cellular glass comprising a horizontal, tunnel-like lehr, a conveyor belt adapted to support cellular glass slabs in vertical position upon one edge, and being disposed substantially spaced from the top and bottom of the lehr, means for gradually cooling slabs of glass upon the conveyor belt comprising a series of vertical flues disposed at each side of the lehr, fans in the flues, each flue having an outlet for the gases below the conveyor belt, baffle means below the belt for causing the gases to rotate horizontally and spiral upwardly and an inlet above the conveyor belt whereby gases are circulated in a zone cyclically in a path substantially at right angles to the axis of the lehr substantially individually in each zone and means for controlling the temperature of each zone individually and means in the lehr for controlling the operation of the temperature controlling means automatically responsive to variations in the temperature of the lehr.

4. Apparatus for annealing cellular glass comprising a horizontal, tunnel-like lehr, a foraminous conveyor belt adapted to support cellular glass slabs in vertical position upon one edge, the belt being in a horizontal plane substantially spaced from the top and bottom of the lehr, means for cooling slabs of glass upon the conveyor belt comprising a series of vertical flues disposed at short intervals along the sides of the lehr, fans in the flues, each flue having outlet discharging gases transversely below the conveyor belt and an inlet for withdrawing gases above the conveyor belt, whereby gases are circulated in zones cyclically in a path substantially at right angles to the axis of the lehr and substantially individually in each zone a set of baffles disposed opposite each outlet for gases below the conveyor belt, said baffles in a set comprising two baffles of approximately semi-circular horizontal section disposed in spaced relation to provide a bell mouth outlet and a set of baffles of curved horizontal section meeting in an apex opposite the outlet between the first two baffles whereby the gases passing about the baffles are caused to circulate upwardly in a spiral path and means for controlling the temperature of the gases circulating through each flue.

5. Apparatus for annealing cellular glass slabs or blocks comprising a tunnel-like lehr, a foraminous conveyor belt disposed in a horizontal plane substantially spaced from the top and bottom of the lehr and being adapted to support the cellular glass slabs or blocks in vertical position upon one edge, means for gradually cooling the slabs or blocks upon the conveyor belt comprising a series of over about 20 of vertical flues disposed at the sides of the lehr, fans in the flues for circulating gases in the lehr, each flue having outlet for gases below the conveyor belt baffles below the conveyor belt for spreading the gases horizontally and spiraling them upwardly and an inlet above the conveyor belt whereby gases are circulated cyclically in a zone transverse in the axis of the lehr substantially individually in each zone and means for controlling the temperature of each zone individually and means disposed in the lehr and being operatively connected to said temperature control, means for automatically adjusting the temperature in order to maintain substantial uniformity of temperature in the lehr at all times.

6. Apparatus for annealing cellular glass comprising a horizontal, tunnel-like lehr, a foraminous conveyor belt adapted to support cellular glass slabs in vertical position upon one edge, the belt being in a horizontal plane substantially spaced from the top and bottom of the lehr, means for cooling slabs of glass upon the conveyor belt comprising a series of vertical flues for each side of the lehr disposed at short intervals along the side of the lehr, fans in the flues, each flue having outlet discharging gases transversely below the conveyor belt and an inlet for withdrawing gases above the conveyor belt, whereby gases are circulated in zones cyclically in a path substantially at right angles to the axis of the lehr and substantially individually in each zone a set of baffles disposed opposite each outlet for gases below the conveyor belt, said baffles in a set comprising two baffles of approximately semi-circular horizontal section disposed in spaced relation to provide a bell mouth outlet and a set of baffles curved horizontal section meeting in an apex opposite the outlet between the first two baffles whereby the gases passing about the baffles are caused to circulate upwardly in a spiral path and means for controlling the temperature of the gases circulating through each flue.

7. Annealing apparatus comprising in combination a lehr tunnel, a foraminous conveyor means for advancing materials being annealed through the lehr tunnel and dividing the same into upper and lower zones, a longitudinally extending series of transversely opposed ducts along side walls of the lehr tunnel, each opposing pair of ducts having inlet openings in the upper zone and outlet openings in the lower zone for circulation of tunnel gases from the upper to the lower zone, means individual to each duct for controlling the temperature of gases circulated therein and baffle means in the lower zone adjacent each outlet for diffusing the discharged gases for substantial uniform upward movement in transverse zones between opposing ducts.

8. Annealing apparatus according to claim 7 wherein the baffle means comprises a plurality of members disposed transversely of the lehr between each opposing pair of ducts and arranged to deflect portions of the gas stream discharged from each duct while permitting other portions of the gas stream to pass for similar deflection adjacent the mid portion of the lehr.

9. Annealing apparatus according to claim 7 wherein the baffle means comprises rows of spaced pairs of suitably formed members arranged to alternately reverse and angularly deflect the gas stream as it impinges upon successive rows of said member.

10. A process of annealing cellular glass products which process comprises conducting the glass upon a foraminous conveyor moving through a series of temperature zones graduated in temperature from a value above the annealing temperature down through and below the annealing temperature, independently circulating the gases within each temperature zone substantially wholly in one direction vertically upward and diffusing the incoming gases of each temperature zone beneath the conveyor to provide substantial horizontal uniformity of temperature within the zone.

11. Annealing apparatus comprising, in combination, wall means forming a relatively long annealing tunnel, conveyor means for advancing the articles to be treated through the tunnel at a level intermediate the top and bottom thereof so that the tunnel is virtually divided into upper and lower zones by said means, a longitudinally extending series of individual gas ducts interconnecting said upper and lower zones to provide a plurality of paths outside of the tunnel proper through which tunnel atmosphere may be passed from one of said zones to the other, means individual to said ducts for producing downdraft therein, fireboxes individual to and in draft connection with the inlet end of said ducts, whereby said draft producing means may draw firebox gases into the inlet end of the ducts, said fireboxes being mounted along the roof of the tunnel.

12. Annealing apparatus according to claim 11, wherein said draft connection comprises a downcomer passage into the upper end of which atmospheric air may enter through a valve-controlled inlet.

13. Annealing apparatus according to claim 11, wherein said draft connection comprises a passage on which the duct inlet faces and whose lower end is open to the upper zone of said tunnel.

ARVID H. BAKER.

REFERENCES CITED

The following references are of record in the file of this patent:

UNITED STATES PATENTS

| Number | Name | Date |
| --- | --- | --- |
| 1,214,217 | Plante | Jan. 30, 1917 |
| 1,232,798 | Heichert | July 10, 1917 |
| 1,641,899 | Nesdahl | Sept. 6, 1927 |
| 1,837,311 | Amsler | Dec. 22, 1931 |
| 1,938,889 | Bloom | Dec. 12, 1933 |
| 2,039,429 | Lydon | May 5, 1936 |
| 2,172,771 | Norris | Sept. 12, 1939 |
| 2,262,243 | Lord | Nov. 11, 1941 |
| 2,275,263 | Merrill | Mar. 3, 1942 |
| 2,401,582 | Owen | June 4, 1946 |

OTHER REFERENCES

"Electric Furnaces," page 20, General Electric Publication, Sept. 1931.